UNITED STATES PATENT OFFICE.

ALBERT F. MEYERHOFER, OF MANNHEIM, GERMANY, ASSIGNOR, BY MESNE ASSIGNMENTS, TO THE CHEMICAL FOUNDATION, INC., A CORPORATION OF DELAWARE.

PROCESS OF MANUFACTURING DENSE WARE FROM BAUXITE.

1,350,825.      Specification of Letters Patent.     Patented Aug. 24, 1920.

No Drawing.     Application filed October 11, 1916. Serial No. 125,116.

*To all whom it may concern:*

Be it known that I, ALBERT FRITZ MEYERHOFER, of Mannheim, Germany, have invented certain new and useful Improvements in Processes of Manufacturing Dense Ware from Bauxite; and I do hereby declare the following to be a full, clear, and exact description of the invention, such as will enable others skilled in the art to which it appertains to make and use the same.

My invention relates to a process of manufacturing ceramic ware from bauxite and its object is to so perform this process that the wares obtained by it are dense and stable.

It is known in the art of ceramics to use bauxite for fireproof materials and also for artificial stone but it was impossible with bauxite, and particularly bauxite alone, to produce wares of dense body. Bauxite has a tendency to contract after firing which is difficult to overcome and, besides, deforms comparatively easy. These qualities did not encourage experiments in this direction. Now I have experimentally established the surprising fact that dense wares can be manufactured from bauxite without binding agents, particularly without fluxes and special sintering additions.

My improved process consists in very finely grinding burned bauxite and working it in this state. The grinding should be so fine that no residue will be left on a screen of 2500 mesh per sq. c. m.

By my process, I am enabled to manufacture dense ceramic wares that are able to stand high temperatures, and in particular refractory wares and such that are not influenced by chemical action. It is remarkable that the burned and finely ground bauxite is workable even without a binding agent. Large-sized vessels can be made from it that will not crack, and they can be fired at temperatures at which the body clinkers without deformation.

The ground and burned bauxite can be worked in any manner known in the art, as by pressing, stamping, beating, casting or turning. It is possible to dispense entirely with binding agents although such, for example clayey or organic matter, may be added if desired in order to increase the stability of the crude body. The shaped articles are fired in the same manner as refractory ware.

I may use for my process bauxite with a high percentage of alumina as well as bauxite mixed with impurities, but preferably the proportion of the latter should not be too high.

The wares are preferably burned in a reducing flame. It is sufficient if the flame is slightly reducing. The favorable action of reduction is due to the formation of iron monoxid, which, with the silica and titanium dioxid present in the bauxite, possibly also with aluminium oxid, forms a fusing mixture, which binds the grains of alumina. For this reason, moderate temperatures are sufficient such as used in the manufacture of refractory ware. I prefer to accelerate the firing operation.

It is particularly remarkable that finely ground and burned bauxite, when mixed with crude bauxite ground to a corresponding degree of fineness, forms a very plastic body, so that the crude bauxite, in this case, acts as a binding agent and while the working is facilitated, yet a perfectly dense body will be obtained. The proportion of crude bauxite should be determined by the behavior of the body when contracting. If the firing is suitably performed the wares will be free from cracks and will not be damaged by the increased contraction.

Other finely ground, non-plastic and refractory materials, such as burned clay or fire-clay, silica, hard burned alumina, natural or artificial corundum, may be mixed with the finely ground and burned bauxite as well as finely ground, crude bauxite. If the proportions are suitably determined, these mixtures will form a dense body as well. It is only necessary to fire the shaped wares after drying.

The following examples will further explain my improved process:

1. French bauxite composed as follows:

Water _____ 14.5 per cent.
    Silica _____ 6.1 " "
    Titanium dioxid ____ 3.3 " "
    Alumina _____ 71.3 " "
    Oxid of iron _____ 4.6 " "

is burned at Seger cone 5 to 6 and by means of ball mills and pneumatic separation reduced to such a degree of fineness that it will pass a 2500-mesh screen (square centimeter) without residue and a 5000-mesh screen with a very small quantity of residue. 6.5 per-cent. of water are added to the ground material which is then pressed into the shape of a stone or plate by means of a hydraulic or toggle press exerting a pressure of about 300 kilos per square centimeter. The shaped articles are dried and rapidly fired at Seger cone 7 in a slightly reducing flame. The fired body is of crystalline structure. It has a perfectly dense fracture, a specific gravity of 3.6 and a hardness beyond 9 of the Mohs scale.

2. In order to form a crucible, I start for example with bauxite having a somewhat greater proportion of impurities. In the particular case I am going to describe the bauxite was composed as follows:

| | | |
|---|---|---|
| Water | 13.0 | per cent. |
| Silica | 12.1 | " " |
| Titanium dioxid | 3.9 | " " |
| Alumina | 60.2 | " " |
| Iron oxid | 10.8 | " " |

Here, burning at Seger cone 1 to 3 is sufficient. The bauxite is ground to the same fineness as in Example 1. The ground material is mixed with water sufficient to form a castable slip. This is molded into a crucible carefully dried and burnt at Seger cone 7. The flame should be reducing.

The wares produced by my process may be highly refractory as well as proof against alkalis and acids. The broken or ground body is a good grinding material.

The body obtained by my process is perfectly homogeneous and, though perhaps very slightly water-absorbent, as a rule perfectly impermeable to gases or liquids. It is very dense and hard, of high specific gravity a good heat conductor, able to withstand changes of temperature, of constant volume and stable. In all these respects, it is equal to artificial corundum. The particular usefulness of my new process is due to the fact that it enables perfectly dense wares to be manufactured from highly refractory and stable material without any difficult preparation and at medium temperatures.

I claim:

1. The process of manufacturing dense, non-porous refractory bauxite wares, which comprises burning the bauxite, finely grinding the product, mixing therewith water to form a plastic mass, forming and burning the same.

2. The process of manufacturing dense, non-porous refractory bauxite wares, which comprises burning the bauxite, finely grinding the product, mixing therewith water to form a plastic mass, forming the same and burning it in a slightly reducing atmosphere.

3. The process of manufacturing dense, non-porous refractory bauxite wares, which comprises burning the bauxite, finely grinding the product, mixing therewith finely ground unburnt bauxite and water to form a plastic mass, forming the mass and burning it.

4. The process of manufacturing dense, non-porous, refractory bauxite ware, which comprises burning bauxite, finely grinding it, mixing therewith finely ground non-plastic refractory material, mixing the product with water to form a moldable mass and firing the molded product.

5. The process of manufacturing dense, non-porous, refractory bauxite ware, which comprises burning bauxite, finely grinding it, mixing therewith finely ground non-plastic refractory material, mixing the product with water to form a moldable mass and firing the molded product in a reducing atmosphere.

6. The process of manufacturing dense, non-porous refractory ware from bauxite, which comprises burning bauxite, grinding to mesh of about 2500 per sq. cm., adding sufficient water to mold, molding the ware, and firing in a reducing atmosphere.

7. A dense, refractory, non-porous, acid fast article of sintered bauxite, very hard, of high specific gravity, a good conductor of heat and of substantially constant volume under conditions of use.

In testimony that I claim the foregoing as my invention, I have signed my name in presence of two subscribing witnesses.

A. F. MEYERHOFER.

Witnesses:
RUDOLPH HASS,
MAX CONSTANTIN.